United States Patent [19]

Marius et al.

[11] Patent Number: 5,059,317

[45] Date of Patent: Oct. 22, 1991

[54] TRANSPORTABLE APPARATUS FOR PRODUCING DRINKING WATER

[76] Inventors: Dietrich Marius, Uferstrasse 9, A-5201 Seekirchen; Erich Müeller, Geismayerstr. 7; Christian Atzmüeller, Muellner Hauptstrasse 17/5, both of A-5020 Salzburg; Walter Doubrawa, Lindonhofstrasse 19, A-5162 Obertrum am See; Helmut Irauscheck, Koestendorferstrasse 52, A-5204 Strasswalchen; Werner Meierhofer, Egon Schile Weg 6, A-5020 Salzburg, all of Austria

[21] Appl. No.: 416,247

[22] Filed: Oct. 2, 1989

[51] Int. Cl.$^5$ ............................................... C02F 9/00
[52] U.S. Cl. ............................ 210/202; 210/257.2; 210/259; 210/266

[58] Field of Search .................. 210/198.1, 257.2, 259, 210/266, 314, 500.36, 900, 202

[56] References Cited

U.S. PATENT DOCUMENTS

| | | | |
|---|---|---|---|
| 3,870,033 | 3/1975 | Faylor et al. | 210/900 |
| 4,064,047 | 12/1977 | Bernreiter et al. | 210/760 |
| 4,548,716 | 10/1985 | Boeve | 210/900 |
| 4,613,441 | 9/1986 | Kohno et al. | 210/500.36 |

*Primary Examiner*—Ivars Cintins
*Attorney, Agent, or Firm*—Thorpe, North & Western

[57] ABSTRACT

An installation for filtering drinking water out of contaminated water, which can be used in many different situations, as it consists of a hydrocyclone, a micro filter unit, a unit for reverse osmosis, a mixed bed ion exchange, a re-salting unit, a unit for ozonization, an activated carbon filter and a unit for chlorinization.

12 Claims, 1 Drawing Sheet

TRANSPORTABLE APPARATUS FOR PRODUCING DRINKING WATER

BACKGROUND

1. The Field of the Invention

This invention relates to transportable units to extract drinking water from contaminated water.

2. The Background Art

Previously known devices used to purify drinking water are used for filtering coarse pollutions out of the water, and to kill existing pathogenic agents. Therefore devices like this have a wide range of use, especially in underdeveloped countries.

The use of mobile units to purify water in industrial countries, that are well supplied with drinking water, is limited to catastrophes. Usually the water is contaminated by oil or gas. These substances can not be filtered by the usual strainers. Therefore, if they get into a normal drinking water purification unit, the ozone device will be overloaded and soiled. Even if oil and gas have been disintegrated by oxidation, human-beings can not drink water filtered like this.

BRIEF DESCRIPTION OF THE INVENTION

The present invention is able to purify oil-contaminated water as well as radionucleides. The invention includes a filter-device containing a micro filter with at least one back-flushable membrane which has pores at the size of less than 1 $\mu$m, preferable approximately 0.2 $\mu$m.

Using the present invention, 90% of the contaminating oil or gas residues are emulsified or suspended and can be removed by microfiltration. The diluted remains are then disintegrated by use of oxidation. The remains of the oxidation process can be filtered as usual by the use of an activated coal filter.

A special advantage of this invention is that embodiments can be devised to filter drinking water out of water polluted by chemicals or radioactive materials. In civil as well as in military catastrophes the solution of filtering such pollutants out of contaminated water is difficult since a well educated chemist can not work at each unit. Furthermore, in exceptional cases it is important that everybody can use the embodiment easily and properly, without having specially trained personnel on hand.

The embodiments of the present invention also provide the important advantage of not having to analyze the contamination, especially for chemical compounds, prior to carrying out the purification process. Also, the present invention is advantageous in that in long term use there is no need for trained personnel. The present invention also eliminates the need of chemical procedures, e.g., the separation of pollutants by flocculation.

Particular embodiments of the invention are especially suitable if the water is suspected to contain substances which cannot be purified by ozonization as for example, highly chlorinated chemicals as they are found in pesticides and chemical weapons. These substances are removed by a special construction of the invention: In addition to the micro filtration, a unit for reverse osmosis can be used.

As in the case of radioactive pollution, which may include such small amounts which can still be harmful to human beings, and are unfiltered by osmosis, all ions have to be removed to eliminate this kind of pollution. Therefore, in addition to the reverse osmosis unit, a mixed bed ion exchange and a unit for salt addition are provided. The unit for salt addition is important to make it drinkable for human-beings.

Further advantages, objects, and details of the invention will be explained later.

DETAILED DESCRIPTION OF THE PREFERRED EMBODIMENT

Figure 1:
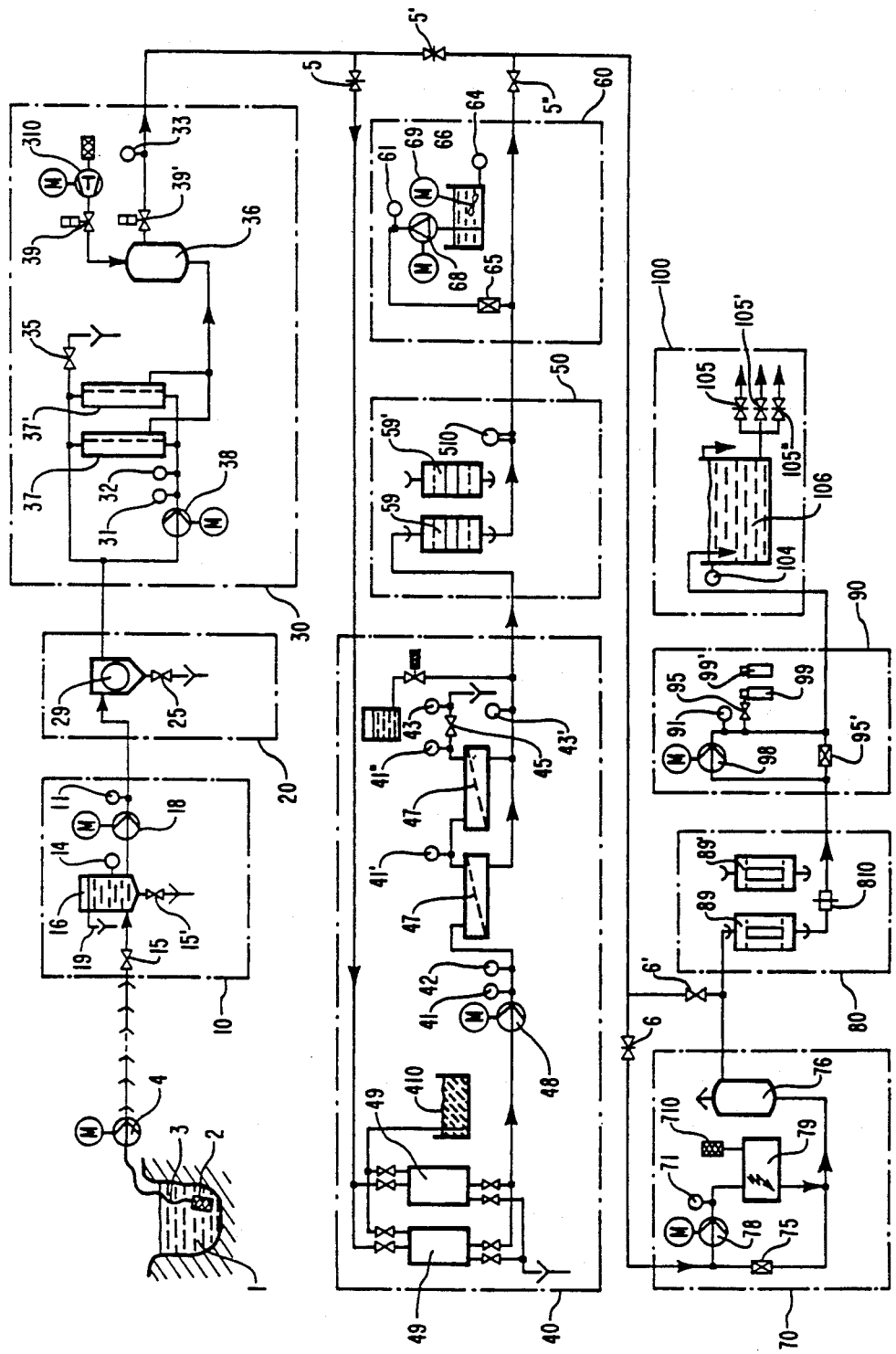
FIG. 1 is a block-diagram of the presently preferred embodiment of invention.

The main components of this installation are:

a raw water tank 10
a hydro cyclone 20
a micro filter unit 30
a unit for reverse osmosis 40
a unit for ion exchange 50
a re-salting unit 60
an ozonization unit 70
an activated carbon filter 80
a chlorination unit 90
a drinking water tank 100

The construction of these elements will be described in detail with their functions.

The water which has to be cleaned is taken up via a suction filter 2 and a hose line 3 to a raw water pump 4, which is on the outside of the unit. From there the water flows into the raw water tank 10. The unit can of course be supplied differently with raw water.

The container 16 is an essential part of the raw water tank 10. It has to stabilize the hydrostatic pressure which builds up on the pressure pump 18. Therefore, an overflow 19 and a water level sensor 14 is used which turns off the pressure pump 18 if the water level in the container 16 is too low. The liquid supply to the container 16 is controlled by the valve 15. To clean the container 16, the waste mud valve 15 can be opened to drain material which has been collected in the conical bottom of the container 16.

Via the pressure pump 18, a pressure controlled by the pressure control 11, is built up in the liquid. This pressure moves the water through the hydro cyclone 20 and through the micro filter device 30.

In the hydrocyclone 20 centrifugal force is used and all suspended particles with a diameter of more than 100 $\mu$m are separated. These contaminates are removed via a ball faucet valve 25.

An essential point of the present invention is micro filter device 30 and membranes 37 and 37'. The raw water, which is under pressure from the pressure pump 18, is guided to these membranes 37 and 37' by the rotating pump 38. The pressure measuring device 31 controls the pressure. A temperature sensor 32 is provided in case the raw water is hot. The temperature sensor 32 turns the rotating pump 38 off if the water temperature exceeds a predetermined threshold so that the membranes 37 and 37' are not damaged.

Of the flowing liquid, which does not pass through the membranes 37 and 37', 25% is always drained through the appropriate adjusted throttle-valve 35.

The membranes 37 and 37' show a nominal pore size of 0.2 $\mu$m. Therefore not only suspended particles can be filtered, but also emulsified components, especially oil emulsified in water.

The membranes, made of sintered polypropylene, can be cleaned by pressing water against the flow through the filters 37 and 37', by means of the compressor 310 out of the back flow container 36. During the appropriate short pressure-push, a magnetic valve 39 is opened and an otherwise open magnet valve 39' is closed.

Controlled by a pressure measuring device, the filtered water flows out of the micro filtering device 30 to the valves 5 and 5'. The position of the valves 5 and 5' determines whether the next step is device 40 for the reverse osmosis, or device 70 for the ozonization.

The device 40 for reverse osmosis consists of two semipermeable screens 47 and 47', which are the primary components of the reverse osmosis device 40. The reverse osmosis device 40 can very well be called a filtering process where water flows under pressure through semipermeable membranes, whereas dissolved salts are filtered out. The necessary pressure is produced by a high pressure pump 48 producing, for example, 23 bar. Pressure measuring devices 41, 41', and 41" control this pressure. A flow-through measuring device 43 and 43' controls the break down of the solution in a product stream containing a high percentage of impurities (approximately 25 to 40%) which is discarded and a product stream having a low concentrate of impurities which will be subjected to the remaining steps of the invention.

Two regular water softening devices are added to the high pressure pump 48. The water softener devices 49 and 49' are selectively operable so that either water softening device 49 or 49' is being used. The water is softened by replacement of Ca by Na, which is added as NaCl, and is coming out of the container 410.

Though approximately 90 to 95% of all dissolved components have been filtered in the reverse osmosis device 40, there are certain cases where the combination of micro filtration and reverse osmosis does not provide drinking water. In particular, dissolved radionucleides require treatment by the mixed bed ion exchange 50. This device consists of at least two containers 59 and 59', which are filled with ion exchange resins. One container 59 or 59', which is filled with unexhausted resinous material, is always placed into the liquid stream. The selection of container 59 or 59' is made by manually connecting the flow tubing to one or the other container.

Through the ion exchange resins, which work in H+ or in OH− cycle, cations and anions are attached on the resin. In exchange, equivalent amounts of H+ and OH− ions, which react with $H_2O$, are separated from the resin. All of the dissolved inorganic salts are filtered.

The efficiency of the mixed bed ion exchange 50, and the moment of the exchange are controlled by a conductive device 510. Measurement results of 0.1 $\mu$m Siemens/cm can be reached absolutely. This shows that no ions are left in the water. The water coming out of the mixed bed ion exchange 50 cannot be drunk by human beings. In the salt addition device the water is made drinkable.

In this example, the salt adding device is container 66, in which a mixer 69 produces a solution of essential salts. This solution flows via a diaphragm measuring pump 68 and a pressure gauge 61 through the back pressure valve 65 in the stream of the totally purified water.

If the water was filtered by reverse osmosis, it can usually flow to the drinking water tank 100 without need of filtering of the water in device 70. Therefore, water filtered by reverse osmosis is passed through the activated carbon filter, whereby valve 6 is closed, and valve 6' is opened. Then the water is chlorinated by device 90.

The activated carbon filter device 80 consists of several containers 89 and 89', filled with filter material. The containers 89 and 89' can be manually selected by making the proper connection. If the water meter 810 measures a certain total amount of filtered water, the other container, either 89 or 89' is used.

Device 90 for chlorination uses chlorine out of the containers 99 or 99' via the valve 95, to enrich the water which has been flowing past the return pressure valve 95' via pump 98 so no newly formed germs can pollute the water. The efficiency of the pump is adjusted to the measurements of the pressure measuring device 91.

The drinking water is stored in the drinking water tank and comes out of the faucets 105, 105', 105". The drinking water tank is built conventionally and consists of a container 106 with a water level sensor 104.

The ozonization of the water flow is performed in the ozonization device 70. The ozonization step must be carried out if the water has not been filtered by reverse osmosis, or at least by ion exchange. The ozonization device 70 contains a back pressure valve 75 and a high pressure pump 78, which transports the water past pressure gauge 71 into the ozonization device 79. Here the filter 710 sucks in air, which is transformed into ozone via passage through high voltage pipes. Also, the water which flows through the device 79, under decomposition to eventually existing bacteria and virus takes place in the reaction container 76.

The complete installation, as drawn in the diagram, has a capacity of 3,000 liters per hour and weighs approximately 2,000 kilograms. It can be put into a housing having dimensions of 2×2×4 meters. This means that the plant can be transported by a regular size truck. When in use it may remain on the truck or it can be put on the ground. If there is no power supply available, the unit can be supplied by an individual power supply, which is mostly installed on a separate trailer.

The special advantage of the described installation is that it can be used for all different kinds of contaminations. This is important especially for military use, because in military applications it cannot be predicted which means of warfare will be used. If, on the other hand, the kind of contamination is known before, the installation can be used only with the necessary device modules, so all the other device modules can be preserved.

Provided below in Table A are examples of components which are preferred for use in the presently preferred embodiment. It is to be understood, however, that other components and structures performing the same or equivalent functions may be used within the scope of the present invention.

TABLE A

| FIG. 1 Reference Numeral | Company | Product Description |
|---|---|---|
| 4 | KSB | Tauchpumpe (water pump) |
| 15 | Gebrüder Grundmann | Membranventil (membranes) |
| 16 | Gria | Rohwassertank V4A-16 (water tank) |
| 14 | Jola | Niveausteuerung SBW/Schwimmerschalter (switch for water level) |
| 19 | Gria | Überlauf (overflow) |
| 18 | Grundfos | Durckerhöhungspumpe CRN (pressure pump gauge) |

TABLE A-continued

| FIG. 1 Reference Numeral | Company | Product Description |
|---|---|---|
| 11 | Wika | Standardmanometer D 100 (gauge) |
| 29 | Hamburger & Co. | Lacos Separator (Hydrocyclone) |
| 25 | Bürkert | Magnetventil 185 VA (magnetic valve) |
| 38 | KSB | Etacrom |
| 31 | WIKA | Standardmanometer (gauge) |
| 32 | WIKA | Standard-Temperaturfühler (temperature sensor) |
| 37 | ENKA | ENKA-Micro-Filtration MD |
| 35 | UNIVAM | Standard-Kugelhahn VA (standard valve) |
| 36 | AMTROL | Well-Extrol-Membrandruckbehälter (membrane pressure container) |
| 310 | AGRE | Standard-Kompressor |
| 39 | Bürlert | Magnet-Ventil 186 (magnetic valve) |
| 33 | WIKA | Standard-Manometer D 100 (gauge) |
| 5 | UNIVAM | Standard-Kugelhahn (standard valve) |
| 49 | EUROWATER | Pendelenthärtungsanlage SM 22/SF/CSC/P (water softening device) |
| 410 | EUROWATER | Salzlösebehälter SM 400 |
| 48 | GRUNDFOS | Druckerhöhungspumpe für Osmose CRN (pressure pump for osmosis) |
| 41 | EUROWATER | Druckschalter RC 0-6 (pressure switch) |
| 42 | WIKA | Standardmanometer D 100 (gauge) |
| 47 | EUROWATER | RO 02-X-VA Druckrohr für Osmose-Module (pressure pipe for osmosis module) |
| 47 | DESAL | SG 4040F Module |
| 45 | UNIVAM | Regulierventil Standard (adjustable valve) |
| 43 | HEINRICHS | Durchflußmesser CD 200/CD 100 (pressure measuring device) |
| 59 | GRIA | Mischbettbehälter MBH 6 C, VA (mixed bed unit) |
| 59 | RELITE | Ionenaustauscherharz CFS-S-L und 3A beide in Mischbettqualität (ion-exchange resin) |
| 510 | EUROWATER | Leitfähigkeitsmessung ST 15 (measuring device) |
| 61 | WIKA | Standard-Manometer D 100 (gauge) |
| 64 | JOLA | Schwimmerschalter SPW (level adjuster-switch) |
| 65 | UNIVAM | Rückschlagventil (reverse pressure valve) |
| 68 | JESCO | Dosierstation MK 2 (dose station) |
| 69 | TURBO-MISCH- UND RUHRAN- LAGEN GMBH | Rührwerk KM (mixer) |
| 79 | GESSLAUER ELECTRONIC Ges.m.b.h. | Ozonomatic Mini-Ozonanlage (ozonizer) |
| 76 | GRIA | Ozon-Kontakt-Tank SDS 30 VA (ozone container) |
| 6 | | See no. 5 |
| 89 | KAMP | Aktivkohle Hydrosorb 601 (activated charcoal) |
| 89 | GRIA | Behälter für Aktivkohle AKF 60 (container for activated charcoal) |
| 810 | HYDROMETER | Wasserzähler, Baureihe 433 (water gauge) |
| 98 | KSB | Pumpe Muliblock C (pump) |
| 99 | AGA | Chlorgasflasche, handelsüblich (chloride bottle) |
| 104 | JOLA | Schwimmerschalter SPW (level switch) |
| 95 | UNIVAM | Rückflußverhinderer-Standardtype (return flow stopper) |

It will be appreciated that the apparatus of the present invention is capable of being incorporated in the form of a variety of embodiments, only one of which has been illustrated and described above. The invention may thus be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for obtaining drinking water out of contaminated water comprising:
    means for filtering the water;
    means for ozonizing the water;
    a micro filter device comprising at least two back-flushable membranes with a nominal pore size at least as small as approximately 0.2 $\mu$m; and
    means for back-flushing the membranes of the micro filter device.

2. An apparatus as defined in claim 1 wherein the micro filter device comprises membranes which are made of sintered polypropylene.

3. An apparatus as defined in claim 2 further comprising a means for performing reverse osmosis sequentially after the micro filter device.

4. An apparatus as defined in claim 3 further comprising at least one means for softening water.

5. An apparatus as defined in claim 4 further comprising:
    mixed bed ion exchange means; and
    re-salting means, said mixed bed ion exchange means and re-salting means being installed immediately after the means for performing reverse osmosis.

6. An apparatus as defined in claim 3 further comprising:
    mixed bed ion exchange means; and
    re-salting means, said mixed bed ion exchange means and re-salting means being installed immediately after the means for performing reverse osmosis.

7. An apparatus as defined in claim 1 further comprising a means for performing reverse osmosis sequentially after the micro filter device.

8. An apparatus as defined in claim 7 further comprising at least one means for softening water.

9. An apparatus as defined in claim 8 further comprising:
    mixed bed ion exchange means; and
    re-salting means, said mixed bed ion exchange means and re-salting means being installed immediately after the means for performing reverse osmosis.

10. An apparatus as defined in claim 7 further comprising:
    mixed bed ion exchange means; and re-salting means, said mixed bed ion exchange means and re-salting means being installed immediately after the means for performing reverse osmosis.

11. An apparatus as defined in claim 1 wherein the micro filter device comprises membranes having a nominal pore size of less than approximately 0.2 μm.

12. An apparatus for obtaining drinking water out of contaminated water comprising:
   means for separating suspended particles from the water, the means for separating suspended particles from the water comprising a hydrocyclone device;
   a micro filter device comprising at least two back-flushable membranes with a nominal pore size at least as small as approximately 0.2 μm;
   means for back-flushing the membranes of the micro filter device;
   means for carrying out reverse osmosis on the water after the water has been treated by the micro filter device;
   mixed bed ion exchange means;
   re-salting means, said mixed bed ion exchange means and re-salting means being installed immediately after the means for performing reverse osmosis;
   means for ozonizing the water;
   means for subjecting the water to filtering by activated carbon; and
   means for adding measured amounts of chlorine to the water.

* * * * *